Oct. 25, 1960    I. F. MATTHYSSE ET AL    2,957,968
DISCONNECT APPARATUS
Filed March 5, 1959    2 Sheets-Sheet 2
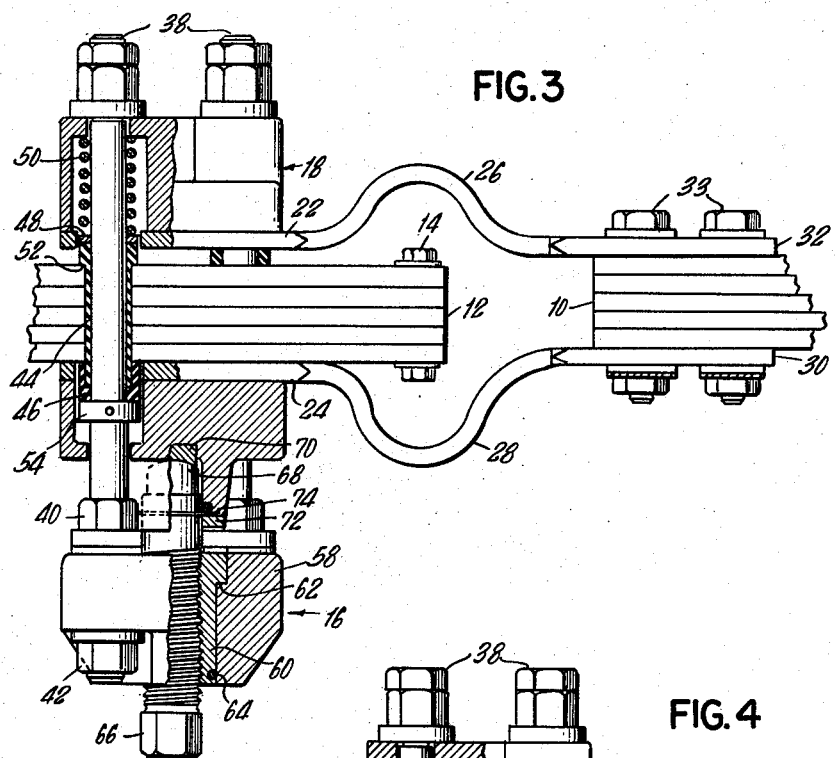
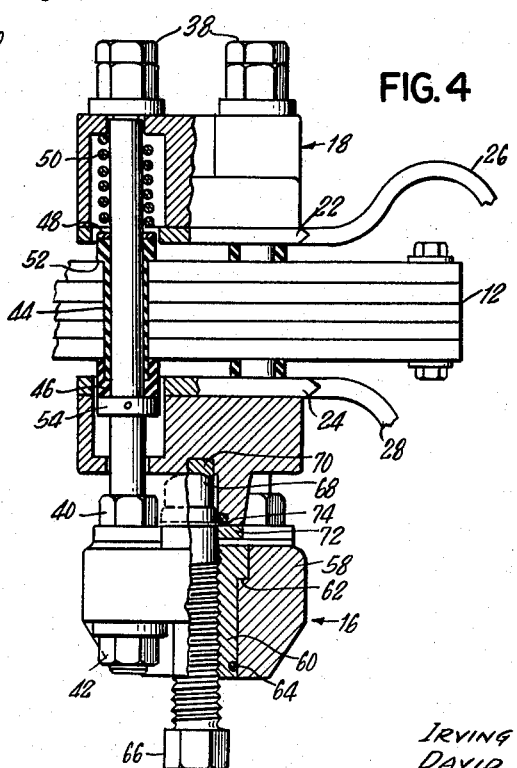
INVENTORS
IRVING F. MATTHYSSE
DAVID B. BOGART
BY
ATTORNEY United States Patent Office 2,957,968
Patented Oct. 25, 1960

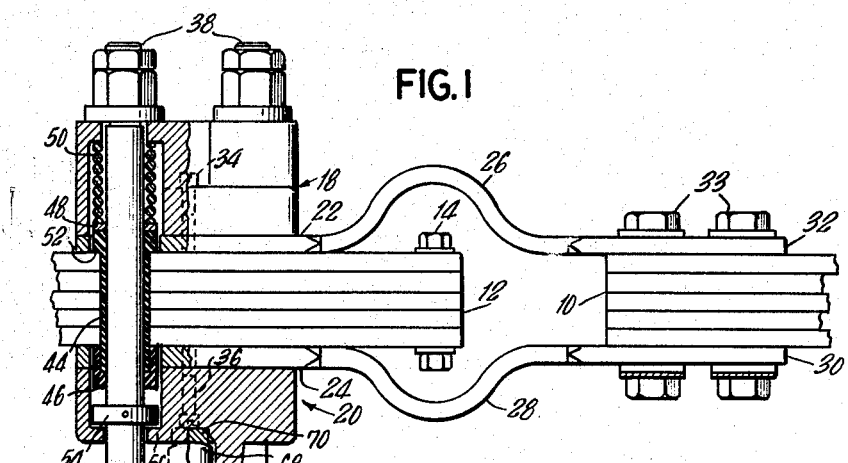
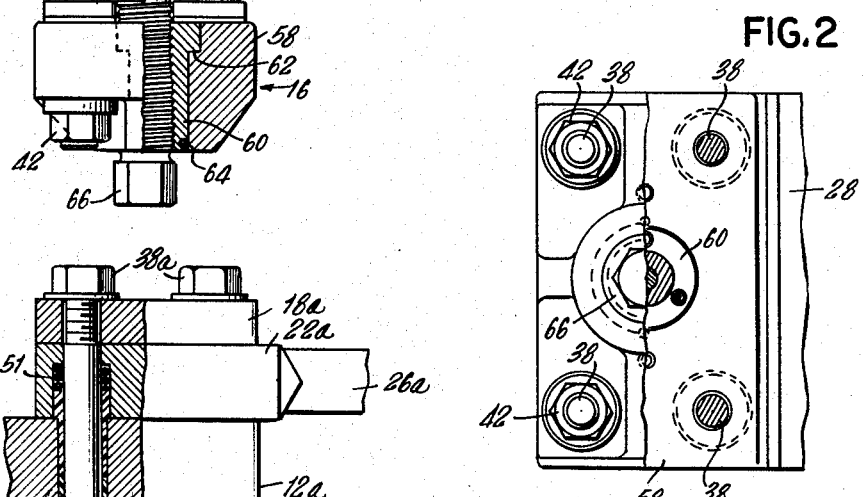
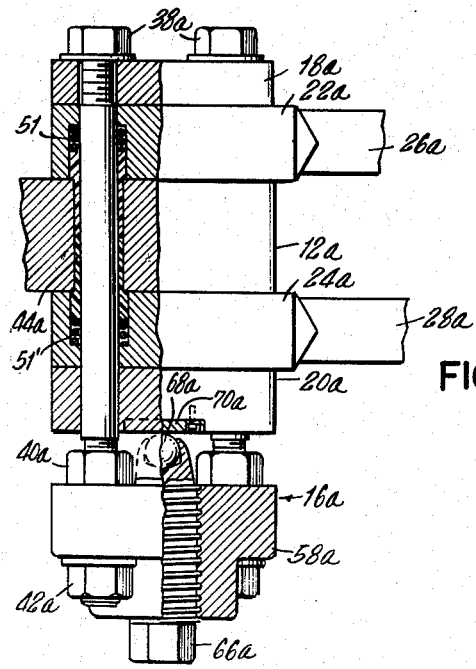

2,957,968
DISCONNECT APPARATUS

Irving F. Matthysse, Danbury, Conn., and David B. Bogart, New York, N.Y., assignors to Burndy Corporation, a corporation of New York Filed Mar. 5, 1959, Ser. No. 797,469

10 Claims. (Cl. 200—158)

This invention relates to improvements in disconnect apparatus for joining a plurality of electrical connectors and, more particularly, to disconnect apparatus which is readily operable to establish and break the electrical connections between spaced bus bar connectors.

In the transmission of large electrical currents, it is common practice to utilize high conductivity bus bars. It is often necessary when utilizing these heavy current conductors to isolate the section of bus bars which feeds a utilizing device from the remainder of the system connected to the source of current. In the past, it has been common practice to use a plurality of bolts to join the sections of bus bar together. In order to provide flexibility to accommodate misalignment of the bus bar sections or to accommodate a difference in expansion between the bus bar section, flexible cable was bolted to each section to form the joint. When it was necessary to disconnect the bus bar sections, a large number of bolts had to be removed and the bus bar sections physically separated. This procedure was inconvenient and costly in time.

One of the objects of this invention, therefore, is to provide a readily operable disconnect apparatus capable of making or breaking an electrical connection between spaced electrical conductors.

Another object of this invention is to provide electrical disconnect apparatus capable of providing a high contact pressure over a relatively large contact area of a bus bar distribution system to provide maximum conductivity under heavy load conditions.

A further object of this invention is to provide disconnect apparatus capable of flexibly joining the spaced sections of electrical conductors.

One of the features of this invention is the provision of disconnect apparatus capable of interrupting the electrical continuity between spaced conductors in which a first and second pressure member are disposed in planar contact with opposite sides of the first conductor system and electrically joined to a second conductor system. A plurality of tie bolts extending through the pressure members and the first conductor system are insulated from the first conductor and coupled to a drive plate assembly which, in actuation of a single bolt, causes the first pressure member to separate from the electrical conductor a given distance after which continued actuation of the drive plate assembly causes the second pressure member to move away from the electrical conductor, thus electrically isolating the pressure members from the conductor system and disconnecting the spaced bus bar system.

Another feature of this invention is the use of flexible cable or strap to connect the first and second pressure member to the spaced second bus bar system in order to provide for misalignment or expansion of the spaced conductor systems.

The above-mentioned and other features and objects of this invention will become more apparent by reference to the following description taken in conjunction with the accompanying drawings, in which:

Fig. 1 is a side elevational view partly in section of the disconnect apparatus of this invention;

Fig. 2 is a top plan view partly in section of the disconnect apparatus of this invention;

Fig. 3 is a side elevational view partly in section of the disconnect apparatus of our invention in its first stage of operation;

Fig. 4 is a side elevational view of our invention in its disconnect position; and Fig. 5 is an alternate embodiment of the disconnect apparatus of this invention.

Referring to Fig. 1 of the drawing, the disconnect apparatus in accordance with the principles of this invention is therein shown to include means for establishing a current conducting connection between the ends of two spaced conductors 10 and 12 which, as shown, comprise a plurality of rectangular shaped current metal members. It will be obvious to those skilled in the art that the conductors 10 and 12 may have other shapes than the rectangular bus bars shown, such as tubular or square or other shapes, suitable for the purpose of conducting the desired currents. While conductor systems 10 and 12 are shown in substantial alignment, this is not essential in carrying out our invention as will hereinafter be shown. The plurality of rectangular current carrying members making up bus bar section 12 are mechanically joined together by means of bolt assembly 14.

The disconnect apparatus is shown to comprise a drive mechanism 16, a rear pressure plate 18 and a front pressure plate 20 which tightly clamp the pressure contact members 22 and 24 to the bus bar conductors 12. By means of flexible jumpers 26 and 28 the electrical circuit from the first bus bar system 12 is coupled to the spaced second bus bar system 10. While flexible jumpers 26 and 28 are illustrated, it is obvious that other types of current carrying members may join the contact pressure members 22 and 24 to the bus bar system 10. Such alternate means would include spring leaf members, or if the bus bar systems 10 and 12 are spaced a sufficient distance, mere metal bus conductors with sufficient flexibility to adjust for misalignment and expansion may be utilized. The flexible jumpers 26 and 28 are terminated by contact plates 30 and 32 which are connected to bus bar system 10 by bolts 33 to establish electrical continuity and maintain the mechanical integrity of the system.

The rear pressure contact member 22 is mechanically joined to the rear pressure plate assembly 12 by means of bolts 34, and the front pressure contact member 24 is mechanically joined to the front pressure plate assembly 20 by means of bolts 36.

A plurality of tie bolts 38 pass through the rear pressure assembly 18, rear pressure contact member 22, the bus bars 12, front pressure contact member 24 and front pressure plate assembly 20 and are mechanically joined to the drive mechanism 16 by means of nuts 40 and 42. Surrounding each tie bolt 38 as it passes through the bus bar conductor 12, is a sleeve 44 composed of an insulating material and the sleeve 44 is capped at one end by insulating cap 46 and at the other end by washer 48. A spring 50 surrounds one end of each of the tie bolts 38 and exerts pressure between the rear pressure plate 18 and the washer 48. The pressure applied to washer 48 is transmitted to the insulating sleeve 44 and by means of shoulder 52 is transferred to the bus bar system 12. A collar 54 is mechanically joined to the tie bolt 38 and is free to move between the shoulder 56 of the front pressure plate 20 and the insulating cap 46. When the collar 54 butts the insulating cap 46, pressure is transmitted through the cap 46 to the bus bar system 12.

The drive assembly 16 of the disconnect apparatus of this invention comprises a face plate 58 having a threaded insert 60 centrally disposed therein. The threaded insert 60 is disposed within the face plate 58 by means of the shoulder 62 and the lock spring or sealing "O" ring 64. An actuating bolt or drive screw 66 passes through the threaded insert and is terminated by a thrust bearing 68 disposed in contact with a thrust plate 70. The thrust plate 70 is located within the front pressure plate assembly 20. A pressure plate collar 72 is mechanically joined to the front pressure plate assembly 20 and a washer 74 is mechanically coupled to the drive screw 66 so that withdrawal of the drive screw from the insert causes pressure to be applied by means of the washer 74 to the pressure plate collar 72. Obviously, if desired, the drive screw 66 may be grease loaded and sealed to prevent corrosion.

In the position shown in Fig. 1, current from the bus bar system 10 is transferred through contact plates 30 and 32 to the flexible jumper straps 26 and 28 which are connected to the front and rear pressure contact members 22 and 24. These members, 22 and 24, are held in planar contact with the bus bar system 12 by means of the front and rear plate assemblies 18 and 20 and thus current is transferred from bus bar conductors 10 through the jumper straps to the bus bar system 12. To disconnect the bus bar system 12 from the source bus bar system 10, the drive screw 66 is actuated. As shown in Fig. 3, the thrust bearing 68 abuts the thrust plate 70, and thus actuation of the drive screw causes the drive assembly 16 to move to the rear of the structure as the drive screw 66 is rotated counterclockwise. Since the tie bolts 38 are coupled to the drive assembly 16 by means of nuts 40 and 42, this movement of the drive assembly 16 causes the tie bolts 38 to move rearward until the collar 54 abuts the insulating cap 46. As this occurs, the rear pressure contact member 22 are forced away from the bus bars 12 under the influence of the spring 50 until the apparatus of this invention assumes the position shown in Fig. 3. It will be noted that the rear pressure contact member 22 is spaced from the bus bar assembly 12, thus electrically isolating the jumper strap 26 from the bus bar system 12. This portion of the electric circuit is broken and no current is transmitted over the jumper strap 26 to the bus bar system 12.

Referring to Fig. 4, continued counterclockwise rotation of the drive screw 66 causes the front pressure contact 24 and front pressure plate assembly to move away from the bus bar system 12. Since the collar 54 abuts the insulating cap 46, the continued rearward movement of the tie bolts 38 is prevented so that the continued counterclockwise rotation of the drive screw 66 in effect withdraws the front pressure plate assembly 20 towards the drive assembly 16. Continued pressure exerted by the spring 50 causes the front pressure contact member 24 to be spaced from the bus bar system 12, effectively disconnecting the jumper strap 28 from the bus bar system 12 and electrically isolating the bus bar system 12 from the bus bar system 10.

Referring to Fig. 5 of the drawing, the alternate embodiment of the disconnect apparatus of this invention is therein shown to comprise a mechanism similar to that heretofore disclosed wherein similar parts bear similar reference numerals. The disconnect apparatus of Fig. 5 is shown connected to a rectangular bus bar 12a and is seen to include a drive mechanism 16a, a rear pressure plate 18a and a front pressure plate 20a which function in the manner heretofore described to clamp contact members 22a and 24a to the bus bar conductor 12a. Flexible jumpers 26a and 28a complete an electrical contact between the bus bar conductor 12a and the spaced bus bar system shown in Fig. 1. A plurality of bolts 38a pass through the rear pressure assembly 18a, rear pressure contact member 22a, front pressure contact member 24a and the front pressure plate assembly 20a and are mechanically joined to the mechanism 16a by means of 40a and 42a. Surrounding each tie bolt 38a as it passes through the rear pressure assembly 18a, rear pressure contact member 22a, front pressure contact member 24a and the front pressure plate assembly 20a and are mechanically joined to the mechanism 16a by means of 40a and 42a. Surrounding each tie bolt 38a as it passes through the bus bar conductor 12a is an insulating sleeve 44a. A pair of springs 51 and 51' apply pressure between the insulating sleeve 44a and the pressure contact members 22a and 24a, respectively. An actuating bolt or drive screw 66a passes through the face plate 58a of the drive assembly 16a and is terminated by a thrust ball bearing 68a, which is in contact with the thrust plate 70a located within the front pressure assembly 20a.

In operation, the species illustrated in Fig. 5 disconnects the contact plates 22a and 24a from the bus bar 12a on actuation of the screw 66a. As the screw 66a is turned, the springs 51 and 51' force the contact plates 22a and 24a away from mechanically and electrically contacting the bus bar assembly 12 simultaneously in a manner similar to the manner heretofore described with respect to the sequential operation in the species shown in Fig. 1. Thus the front and rear contacts are simultaneously separated in the species shown in Fig. 5.

While the above mechanism has been illustrated with respect to the operation concerning a single bolt 38 or 38a, it should be readily apparent that a similar separating mechanism is associated with each of the other bolts.

It should be particularly noted that the bearing surface 68 of drive screw 66 in Fig. 1 and the bearing 68a in Fig. 3 have an arcuate surface in contact with the thrust plates 70 and 70a, respectively. Thus, as the surface contact area is reduced to a minimum, friction is minimized. As greater thrust is transmitted between the bearing surface and plate, the bearing surface flattens slightly until the total necessary force is transmitted. This flattening permits the necessary force to be transmitted with a minimum applied torque since the friction radius between the bearing and plate are at a minimum.

We have thus described our invention, but we desire it understood that it is not confined to the particular forms or uses shown and described, the same being merely illustrative, and that the invention may be carried out in other ways without departing from the spirit of our invention and, therefore, we claim broadly the right to employ all equivalent instrumentalities coming within the scope of the appended claims, and by means of which, objects of our invention are attained and new results accomplished, as it is obvious that the particular embodiments herein shown and described are only some of the many that can be employed to attain these objects and accomplish these results.

We claim:

1. Disconnect apparatus for interrupting a current conducting path comprising a first current conducting means, a driven means in substantially planar contact with said current conducting means, a spring means forcing said driven means into contact with said first current conducting means, a second current conducting means, means electrically coupling said second current conducting means to said driven means, driving means coupled to said driven means and means to advance said driving means toward said first current conducting means to move said driven means in a linear path perpendicular to the plane of said planar contact.

2. Disconnect apparatus according to claim 1 wherein said driven and driving means are coupled by means extending through and insulated from said first current conducting means.

3. Disconnect apparatus for interrupting a current conducting path between first and second current conducting means comprising a first driven means in substantially planar contact with said first current conducting means, a second driven means in substantially planar contact with said first current conducting means, a means electrically coupling said first and second driven means to said second current conducting means, driving means coupled to said first and second driven means and means to move said first and second driven means in linear paths perpendicular to the plane of said planar contact responsive to said driving means.

4. Disconnect apparatus in accordance with claim 3 wherein said driving means simultaneously moves said first and second driven means in said linear paths.

5. Disconnect apparatus in accordance with claim 3 wherein said driving means moves said first and second driven means in sequence in said linear paths.

6. Disconnect apparatus in accordance with claim 3 wherein first and second driven means are disposed on opposite sides of said first current conducting member.

7. Disconnect apparatus in accordance with claim 6 further including means coupling said driving means to said driven means extending through and insulated from said first current conducting means.

8. Disconnect apparatus in accordance with claim 3 wherein said first and second driven means move in linear paths in opposite directions perpendicular to the plane of said planar contact.

9. Disconnect apparatus in accordance with claim 3 which further includes spring means to exert a force against said first and second driven members to ensure said planar contact.

10. Disconnect apparatus for interrupting a current conducting path between first and second current conducting means comprising a first driven means in substantially planar contact with one side of said first current conducting means, a second driven means substantially in planar contact with the other side of said first current conducting means, means electrically coupling said first and second driven means to said second current conducting means, driving means, means coupling said driving means to said first and second driven means, said coupling means including at least one bolt member extending through said first current conducting means, means insulating said bolt from said first current conducting means, said driving means including means to advance said bolt toward said first current conducting means to cause second driven means to be spaced from said first current conducting means, means limiting the forward motion of said bolt, means responsive to further actuation of said driving means to advance said second driven means away from said first current conducting means and means to limit said second movement.

References Cited in the file of this patent

UNITED STATES PATENTS

| | | |
|---|---|---|
| 1,675,114 | Laird | June 26, 1928 |
| 2,064,736 | Dahl | Dec. 15, 1936 |